(12) United States Patent
Uddin et al.

(10) Patent No.: US 9,856,573 B2
(45) Date of Patent: Jan. 2, 2018

(54) PLANCHET HOLDER FOR ELECTRODEPOSITION OF MATERIALS

(71) Applicant: KUWAIT INSTITUTE FOR SCIENTIFIC RESEARCH, Safat (KW)

(72) Inventors: Saif Uddin, Eagila (KW); Montaha H. A. Behbehani, Al-Daiy'Ha (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 299 days.

(21) Appl. No.: 14/668,923

(22) Filed: Mar. 25, 2015

(65) Prior Publication Data

US 2016/0281258 A1   Sep. 29, 2016

(51) Int. Cl.
| | | |
|---|---|---|
| C25D 17/06 | (2006.01) | |
| C25D 7/00 | (2006.01) | |
| C25D 5/02 | (2006.01) | |
| C25D 9/00 | (2006.01) | |
| G01T 7/06 | (2006.01) | |
| C25D 3/54 | (2006.01) | |
| C25D 9/04 | (2006.01) | |

(52) U.S. Cl.
CPC ............. C25D 7/00 (2013.01); C25D 5/028 (2013.01); C25D 9/00 (2013.01); C25D 17/06 (2013.01); G01T 7/06 (2013.01); C25D 3/54 (2013.01); C25D 9/04 (2013.01)

(58) Field of Classification Search
CPC . C25D 3/54; C25D 7/00; C25D 17/00; C25D 17/06; G01T 7/06
USPC ............................ 269/46, 287–288, 900, 909
See application file for complete search history.

(56) References Cited

U.S. PATENT DOCUMENTS 5,976,331 A * 11/1999 Chang ...................... C25D 7/12
 204/224 R
8,888,981 B2   11/2014 De Sanoit et al.

FOREIGN PATENT DOCUMENTS

FR  2779865 A1  12/1999
WO  WO 2014/153658 A1  10/2014

OTHER PUBLICATIONS

Jia et al (Applied Radiation and Isotopes, vol. 53, issues 1-2, 2000, pp. 115-120).*

(Continued)

*Primary Examiner* — Luan Van
*Assistant Examiner* — Alexander W Keeling
(74) *Attorney, Agent, or Firm* — Richard C. Litman

(57) ABSTRACT

The planchet holder for electrodeposition of materials includes a container cover configured to securely fit over the mouth of a beaker. An elongate suspension post passes through a through-hole in the cover a predetermined distance, and a holder assembly is coupled to the suspension post to be suspended within the beaker at a select height from the bottom of the beaker. A planchet receptacle extends axially from a body of the holder assembly, and a substrate recess is formed at a distal end of the planchet receptacle for selective placement of a planchet. An endcap is secured onto the planchet receptacle to securely capture the planchet, and a port in the endcap exposes one face of the planchet for electrodeposition of a material. The planchet holder holds the planchet stationary within the beaker and exposes only one face for electrodeposition and subsequent analysis, thereby reducing time and costs.

13 Claims, 3 Drawing Sheets

(56) References Cited

OTHER PUBLICATIONS

Schlenker (Dosimetry of Paranasal Sinus and Mastoid Epithelia in Radium-Exposed Humans, 1980, pp. 1-261).*
Bailey et al., "Individual Monitoring Conducted by the Health Protection Agency in the London Polonium-210 Incident," *Health Protection Agency Centre for Radiation, Chemical and Environmental Hazards, Radiation Protection Division*, Publication: Jun. 2010.

* cited by examiner

PLANCHET HOLDER FOR ELECTRODEPOSITION OF MATERIALS

BACKGROUND OF THE INVENTION

1. Field of the Invention

The present invention relates to laboratory equipment, and particularly to a planchet holder for electrodeposition of materials onto a select side of a planchet to substantially reduce analysis time of the material deposited thereon.

2. Description of the Related Art

In a typical spectroscopy analysis of certain materials, such as polonium-210 ($^{210}$Po), a substrate in the form of a metal disc or planchet is submerged in a beaker containing a sample or solution with polonium to be electrodeposited onto the planchet. The planchet is a blank metal disk, typically made from nickel, silver, or an alloy of nickel and silver. The solution and planchet is placed on a magnetic hotplate and stirred for about four hours to permit electrodeposition of $^{210}$Po onto the planchet. Since the planchet is freely floating in the solution, both faces or sides of the planchet will be plated with $^{210}$Po.

Since the planchet is coated on both sides, the time for spectroscopic analysis can be overly long. For example, it requires about 22 hours per side to obtain a complete alpha spectroscopic count of the plated material. That equates to a total of 44 hours per planchet. Moreover, the integrity of the count can potentially be compromised by the planchet being exposed to magnetic forces and the beaker walls during agitation by the magnetic hotplate.

Thus, a planchet holder for electrodeposition of materials solving the aforementioned problems is desired.

SUMMARY OF THE INVENTION

The planchet holder for electrodeposition of materials includes a container cover configured to securely fit over the mouth of a beaker. An elongate suspension post passes through a through-hole in the cover a predetermined distance, and a holder assembly is coupled to the suspension post for suspension within the beaker at a select height from the bottom of the beaker. A planchet receptacle extends axially from the body of the holder assembly, and a substrate recess is formed at a distal end of the planchet receptacle for selective placement of a planchet. An endcap is secured onto the planchet receptacle to securely capture the planchet, and a port in the endcap exposes one face of the planchet for electrodeposition of a material. The planchet holder holds the planchet stationary within the beaker and exposes only one face for electrodeposition and subsequent analysis, thereby reducing time and costs.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
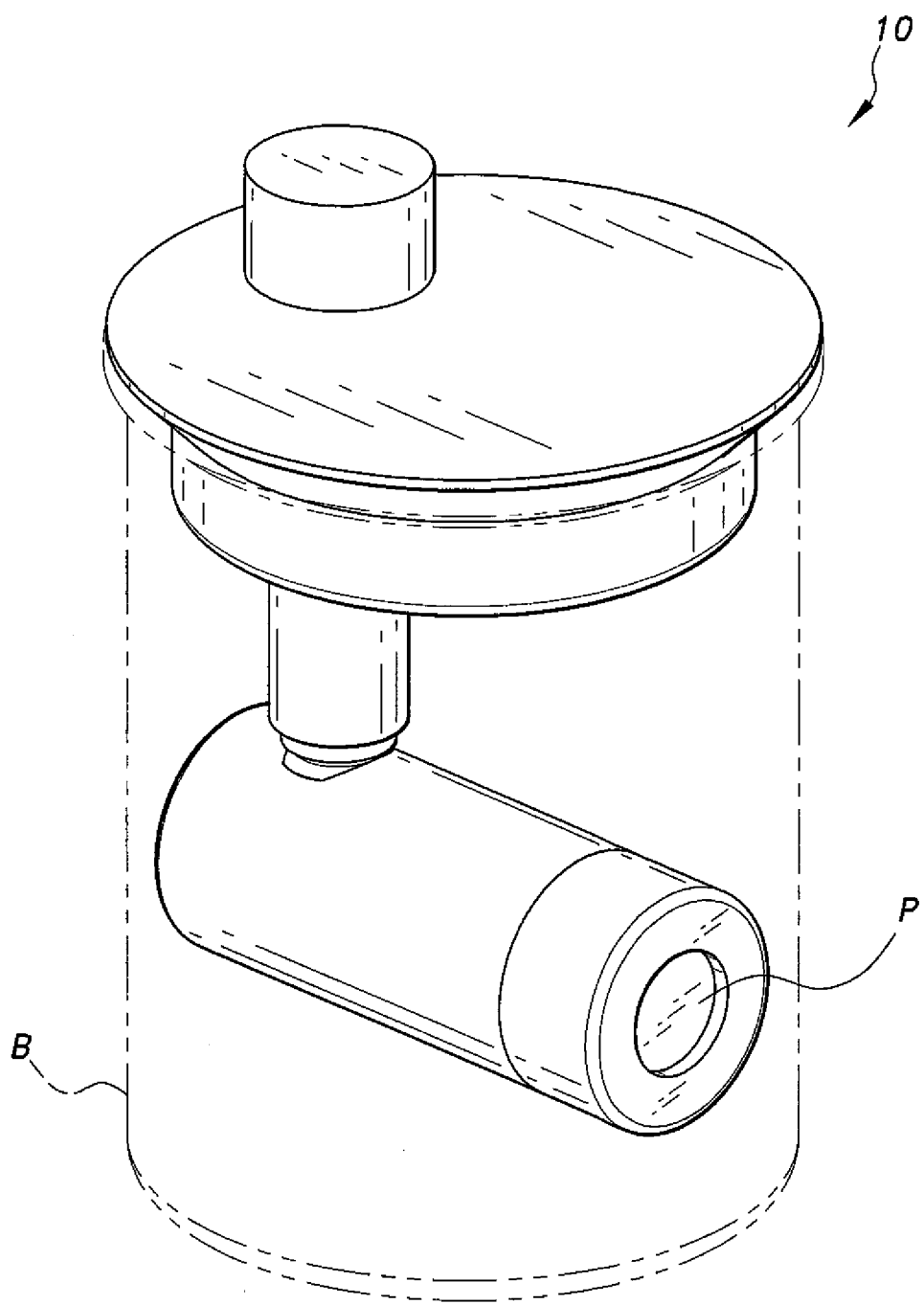
FIG. 1 is an environmental, perspective view of a planchet holder for electrodeposition of materials according to the present invention.

The planchet holder for electrodeposition of materials, generally referred to by the reference number 10 in the drawings, provides a relatively simple means of holding a planchet so that only one side can be subjected to deposition in isolation, thereby reducing the time for a subsequent alpha spectroscopic count to about 22 hours. Moreover, the planchet is suspended within the sample or solution inside the beaker without touching any of the interior walls of the beaker, which substantially reduces or eliminates potential marring of the surface of the planchet, which might compromise the integrity of the deposited surface layer.

Figure 2:
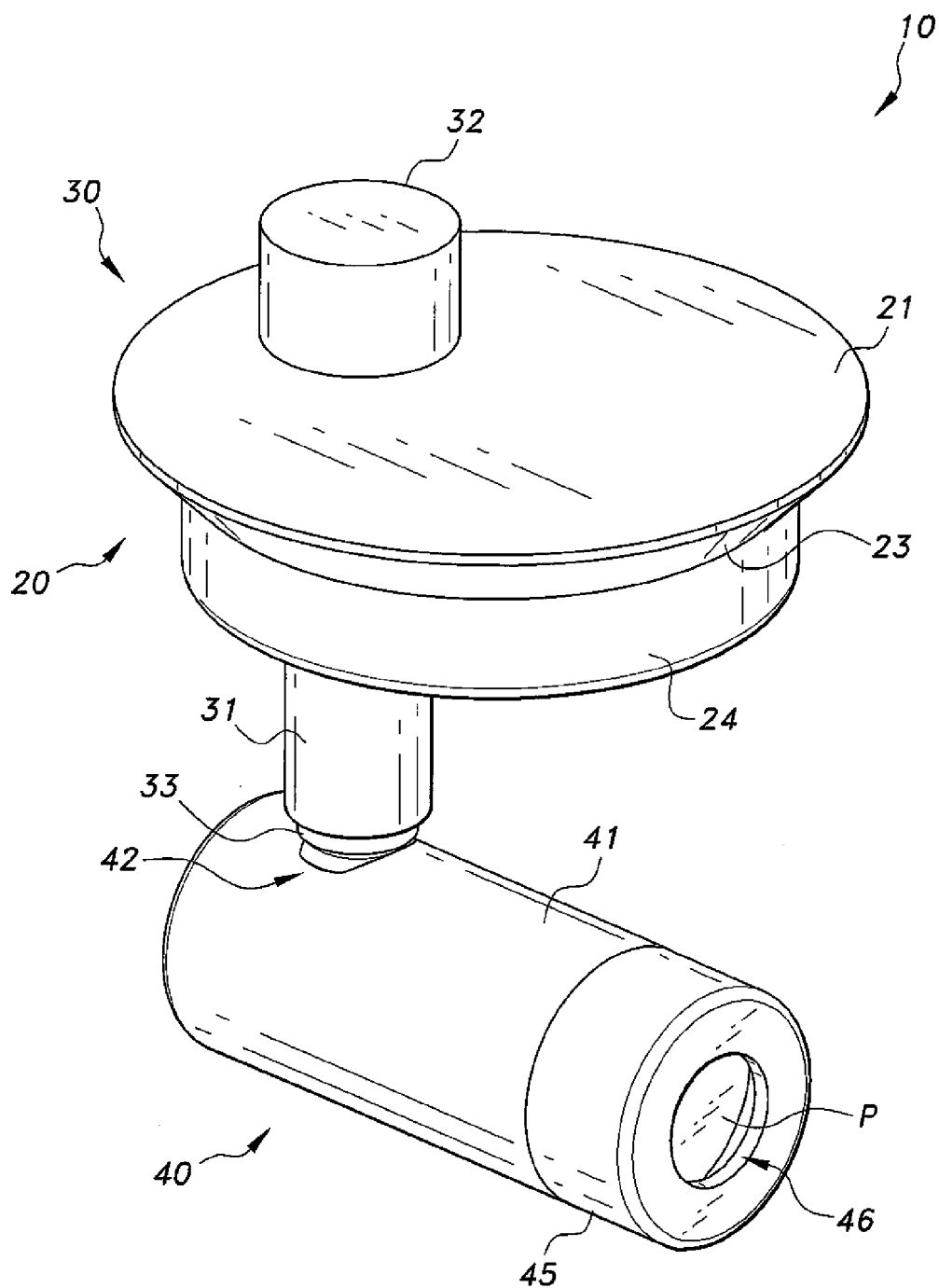
FIG. 2 is a perspective view of the planchet holder of FIG. 1.
Figure 3:
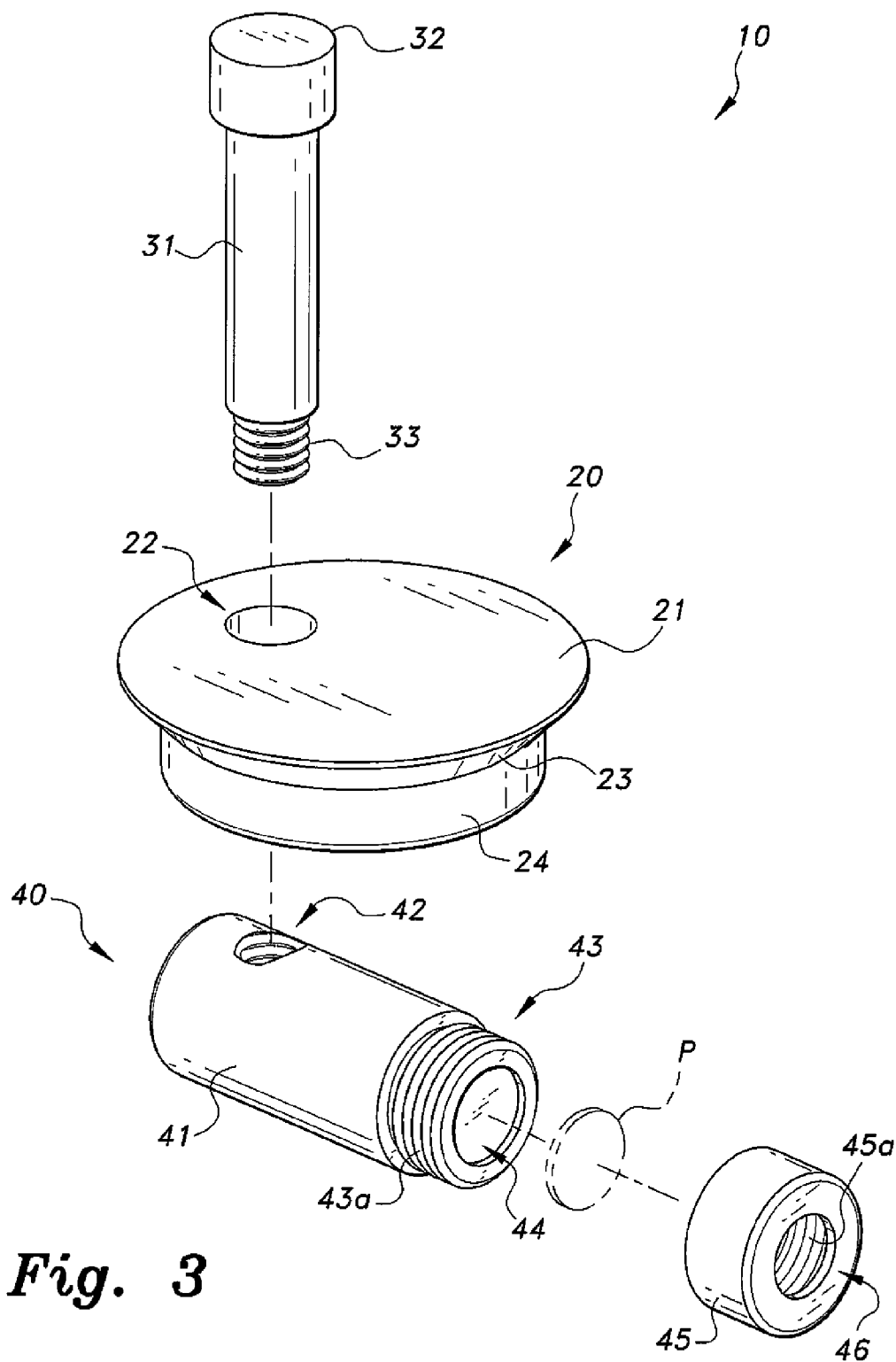
FIG. 3 is an exploded perspective view of the planchet holder of FIG. 1.

As best seen in FIGS. 1-3, the planchet holder 10 includes a container cover or lid 20 configured to seal or rest over an opening or mouth of a container, a holder assembly 40 to securely hold a planchet P therein, and a suspension post 20 coupled between the container cover 20 and the holder assembly 40 to hang or suspend the holder assembly 40 at a select or predetermined height within the container. The container may be a beaker B, which holds the sample or solution containing a material to be electrodeposited onto the planchet P. An example of such a material is $^{210}$Po, and the beaker B may be a conventional 250 ml beaker. It is noted, however, that the container can be a vessel of any size or shape that can hold any suitable solution for laboratory analysis. Moreover, the material to be electrodeposited can be provided in a variety of concentrations and chemical compositions that allows for electrodeposition, and the material to be electrodeposited can include metals and non-metals, depending on the specific application and needs of the user. The shape of the container cover 20 can be varied to fit other containers.

The container cover 20 is preferably a circular, generally hollow disc 21 dimensioned to fit over the mouth or opening of the beaker B in a similar manner to a lid that fits over the lip of the beaker B, and may have a lip or flange to rest upon the rim of the beaker B. A through-hole 22 is formed in the disc 21 to permit the suspension post 30 to be slidably inserted into the beaker B. The through-hole 22 is preferably placed at an offset from the center of the disc 21 to substantially center the holder assembly 40 when assembled. However, the location of the through-hole 22 can be varied, depending on the construction of the holder assembly 40.

The container cover 20 includes a beveled flange 23 sloping inwardly towards the center of the disc 21 from the periphery thereof. An annular sidewall 24 depends from the beveled flange 23. The overall frustoconical shape of the beveled flange 23 and the annular sidewall 24 permits the cover 20 to easily slide into the opening of the beaker B and be secured thereon. Moreover, this overall shape conforms to the flared lip of most conventional beakers. The sidewall 24 prevents the cover 20 from sliding off the top of the beaker B since the sidewall 24 will abut the sidewall of the beaker B whenever the cover 20 moves laterally, e.g., via accidental collisions or agitation from the magnetic hotplate.

The container cover 20 functions as a support plate for hanging the holder assembly 40 a select depth within the beaker B. To facilitate hanging of the holder assembly 40, the planchet holder 10 includes the suspension post 30. The suspension post 30 includes an elongate member or stem 31 having a head 32 at one end and a connector 33 at the opposite end. The elongate stem 31 is preferably smaller in dimension than the through-hole 22 on the cover 20 so that the suspension post 30 can easily slide through the through-hole 22. The head 32 of the post 30 is larger in dimension compared to the circumference of the elongate stem 31 and the through-hole 22. The head 32 functions as a stop, preventing the elongate stem 31 from completely dropping into the beaker B when assembled. The connector 33 facilitates mounting of the holder assembly 40 thereon. The connector 33 is preferably a threaded end of the elongate stem 31. When the holder assembly 40 is mounted to the suspension post 30, the length of the elongate stem 31 is suitably long enough to suspend the holder assembly 40 above the bottom of the beaker B without contacting the bottom or the sidewall of the beaker B, thereby enabling complete isolated submersion of the planchet P within the solution. An exemplary length of the elongate stem 31 is about three inches.

The holder assembly 40 includes an elongate body 41 dimensioned to fit inside the beaker B without touching the interior sidewall of the beaker B. The body 41 is preferably an elongate cylindrical member and includes a mating connector 42 on the side of the body 41 for attachment to the connector 33 on the suspension post 30. The mating connector 42 may be an internally threaded bore for selectively receiving the threaded end of the suspension post 30. The threaded mounting or engagement provides a secure connection between the suspension post 30 and the holder assembly 40 that can withstand the rigors of the magnetic hotplate. It is contemplated, however, that other types of connecting mechanisms, such as snap-fit connectors, interference-fit connectors, interlocking connectors, and the like can also be suitable for securing the holder assembly 40 onto the suspension post 30.

A planchet receptacle 43 axially extends from one end of the body 41, and a substrate recess, cavity, or depression 44 is formed at the distal end thereof. The substrate recess 44 is preferably a circular depression dimensioned to receive a planchet P or other substrate therein. Exemplary dimensions of the substrate recess 44 are about 12.2 mm in diameter and about 2 mm in depth. When the planchet P is mounted inside the substrate recess 44, only one face or side of the planchet P is exposed to the surrounding environment, since the opposite side rests on the bottom of the substrate recess 44. Thus, at least the opposite face of the planchet P is effectively covered.

To insure the planchet P stays inside the substrate recess 44, the holder assembly 40 includes an endcap 45. The endcap 45 is provided with internal threads 45a to secure the endcap 45 onto the planchet receptacle 43 by engaging external threads 43a thereon, which captures the planchet P between the planchet receptacle 43 and the endcap 45. A port 46 is formed at the top of the endcap 45 to provide access to the planchet P for the solution inside the beaker B. The port 46 may be about 12 mm in diameter.

This construction of the endcap 45 serves various functions, in addition to securing the planchet P. Tightening the endcap 45 about the planchet receptacle 43 clamps and captures the planchet P within the substrate recess 44. In most instances, the depth and diameter of the substrate recess 44 is about the same as that of the conventional planchet P so that the planchet P will seat substantially flush inside the substrate 44 with minimal play. However, there may be some instances in which the planchet P may not be flush within the substrate recess 44 due to inconsistencies in manufacture of the planchet P. The clamping functionality of the endcap 45 accommodates for such insistencies. The port 46 is preferably slightly smaller in diameter compared to the diameter of the substrate recess 44. The port 46 and the dimensions thereof also ensure that only the exposed surface of the planchet P through the through-hole 46 will be subjected to electrodeposition during the electroplating process. Thus, only one side or face of the planchet P will be electrodeposited with material, such as $^{210}$Po, which substantially reduces the subsequent spectroscopic analysis time compared to conventional methodology. Moreover, the unexposed side of the planchet P can be used for electrodeposition of a different solution and subsequent analysis, which increases the useful life of the planchet P and reduces costs.

It is to be understood that the present invention is not limited to the embodiments described above, but encompasses any and all embodiments within the scope of the following claims.

We claim:

1. A planchet holder for electrodeposition of materials, comprising:
   a container cover adapted to fit over a mouth of a container, the container cover having a through-hole defined therein;
   an elongate suspension post slidable through the through-hole in the container cover, the suspension post having a connector at a distal end thereof; and
   a holder assembly selectively attached to the connector and extends perpendicular to the suspension post, the holder assembly having a substrate recess adapted for selectively receiving a planchet therein and an endcap secured over the substrate recess to clamp the planchet in the recess, the endcap having a port defined therein for exposing one face of the planchet to electrodeposition of a material thereon, further wherein the holder assembly includes;
   i) an elongate body;
   ii) a holder connector formed on a side of the elongate body, the holder connector mating with the connector on said suspension post to securely mount the body to the suspension post; and
   iii) a planchet holder extending axially from one end of the elongate body, the planchet holder having external threads, the substrate recess being formed at a distal end of the planchet holder, the endcap having internal threads mating with the holder's external threads to clamp the planchet between the endcap and the substrate recess.

2. The planchet holder according to claim 1, wherein said container cover comprises:
   a disc defining the through-hole therein and defining a center and a periphery;
   a beveled flange extending inwardly towards the center from the periphery of the disc; and
   an annular sidewall depending from the beveled flange.

3. The planchet holder according to claim 1, wherein said suspension post comprises:
   an elongate stem slidable through the through-hole defined in said container cover; and
   a suspension head disposed on one end of the elongate stem, the suspension head having a dimension greater than a dimension of the through-hole to prevent the elongate stem from extending completely through said container cover, said connector being disposed at the elongate stem opposite the suspension head.

4. The planchet holder according to claim 3, wherein said stem has a length of about three inches.

5. The planchet holder according to claim 3, wherein said connector comprises a threaded end of said elongate stem.

6. The planchet holder according to claim 1, wherein said substrate recess has a depth of about 2 mm and a diameter of about 12.2 mm.

7. The planchet holder according to claim 1, wherein the port defined in said endcap has a diameter of about 12 mm.

8. A method of holding a planchet for electrodeposition of materials, comprising the steps of:
providing a planchet having at least two faces for electrodeposition of material thereon;
providing a container having a solution of material to be electrodeposited onto the planchet;
providing a planchet holder to hold the planchet therein with only one face exposed for electrodeposition of the material;
wherein the planchet holder comprises the following;
a container cover adapted to fit over a mouth of a container, the container cover having a through-hole defined therein;
an elongate suspension post slidable through the through-hole in the container cover, the suspension post having a connector at a distal end thereof; and
a holder assembly selectively attached to the connector and extends perpendicular to the suspension post, the holder assembly having a substrate recess adapted for selectively receiving a planchet therein and an endcap secured over the substrate recess to clamp the planchet in the recess, the endcap having a port defined therein for exposing one face of the planchet to electrodeposition of a material thereon, further wherein the holder assembly includes;
i) an elongate body;
ii) a holder connector formed on a side of the elongate body, the holder connector mating with the connector on said suspension post to securer mount the body to the suspension post; and
iii) a planchet holder extending axially from one end of the elongate body, the planchet holder having external threads, the substrate recess being formed at a distal end of the planchet holder, the endcap having internal threads mating with the holder's external threads to clamp the planchet between the endcap and the substrate recess; and
suspending the planchet holder in the container at an elevated position within the solution and the container without touching sidewalls or bottom of the container.

9. The method of holding a planchet according to claim 8, wherein said container cover comprises: a disc having the through-hole formed therein and having a center and a periphery; a beveled flange extending inwardly towards the center from the periphery of the disc; and an annular sidewall depending from the beveled flange.

10. The method of holding a planchet according to claim 8, wherein said suspension post comprises: an elongate stem slidable through the through-hole in said container cover; and a suspension head disposed at one end of the elongate stem, the suspension head having a dimension greater than a dimension of the through-hole to prevent the elongate stem from sliding completely through the through-hole, the connector being disposed at an end of the elongate stem opposite the suspension head.

11. The method of holding a planchet according to claim 10, wherein said connector comprises a threaded end of said elongate stem.

12. The method of holding a planchet for electrodeposition of materials according to claim 8, wherein the material to be electrodeposited comprises $^{210}$Po.

13. A planchet holder for electrodeposition of materials, consisting of:
a circular container cover having a central axis and adapted to fit over a mouth of a container, the container cover having a through-hole defined therein, wherein the through-hole is offset from the central axis;
an elongate suspension post slidable through the through-hole in the container cover, the suspension post having a connector at a distal end thereof; and
a holder assembly selectively attached to the connector and extends perpendicular to the suspension post, the holder assembly having a substrate recess adapted for selectively receiving a planchet therein so that the planchet extends in a plane parallel to the suspension post and an endcap secured over the substrate recess to clamp the planchet in the recess, the endcap having a port defined therein for exposing one face of the planchet to electrodeposition of a material thereon.

* * * * *